Dec. 31, 1946.  F. W. SIDE  2,413,584
CONTROL INSTRUMENT
Filed Nov. 8, 1940
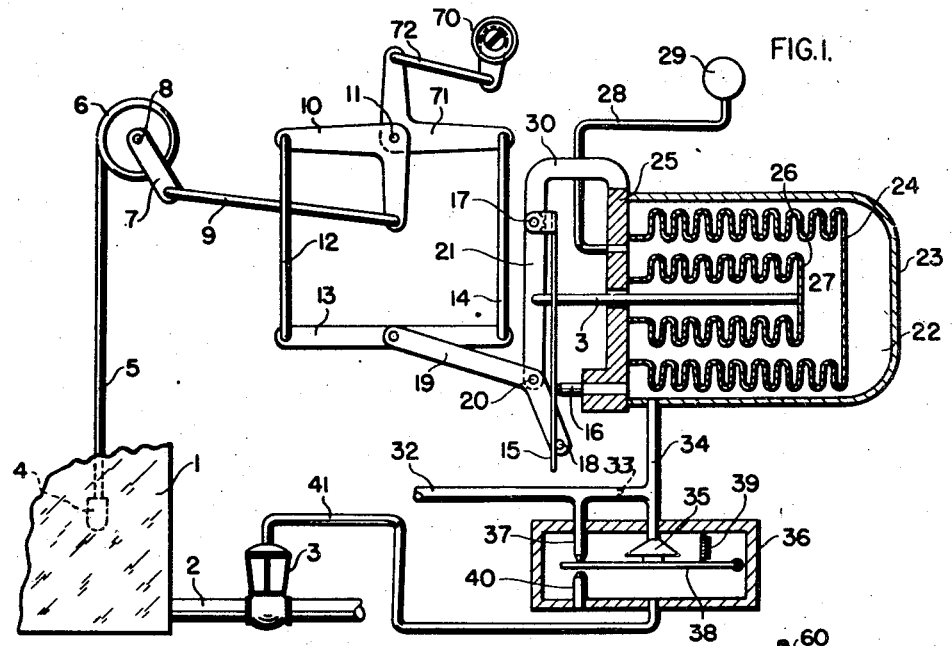
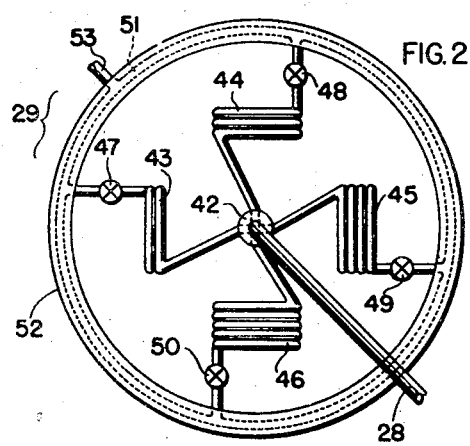
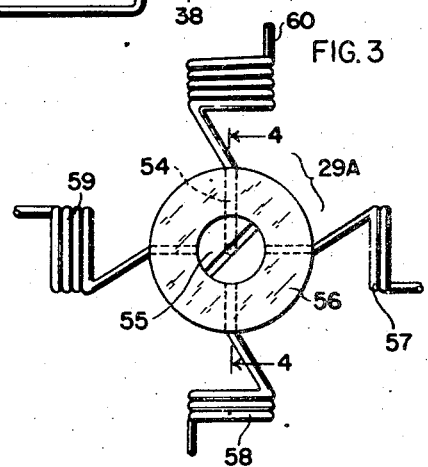
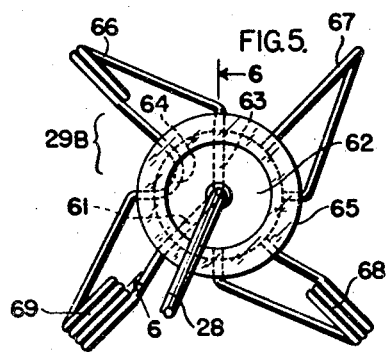
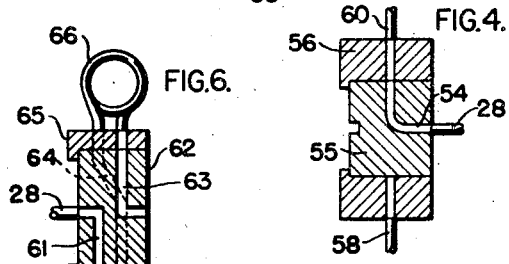
INVENTOR.
FREDERICK W. SIDE
BY *C. B. Spangenberg*
ATTORNEY Patented Dec. 31, 1946

2,413,584

UNITED STATES PATENT OFFICE 2,413,584

CONTROL INSTRUMENT

Frederick W. Side, Philadelphia, Pa., assignor to The Brown Instrument Company, Philadelphia, Pa., a corporation of Pennsylvania Application November 8, 1940, Serial No. 364,881

2 Claims. (Cl. 188—94)

My present invention comprises improvements in fluid pressure control apparatus operating to create a control fluid pressure force which is impressed on a fluid pressure control motor or analogous control actuating element and which varies in accordance with changes in a control condition such, for example, as a temperature, a pressure, a height of liquid level, or a velocity, the controlling condition usually, though not necessarily, being returned to or toward a normal value on a departure therefrom, by the operation of said motor or analogous device.

A main object of the invention is to provide specific improvements in that portion of an air control apparatus which serves to vary the rate at which the reset or compensating action of such an apparatus may take place. This is accomplished by providing the apparatus with a series of lengths of small-bore tubing through which the air that controls the speed of reset must pass. Each of the pieces of tubing is of a different length so that by connecting one or the other of the tubes with the air control apparatus the speed with which air bleeds through the tubing will be changed.

It is a further object of the invention to control the speed of reset of an air control instrument by providing a plurality of small-bore tubes of different lengths, each of which may readily be connected with the instrument.

The various features of novelty which characterize my invention are pointed out with particularity in the claims annexed to and forming a part of this specification. For a better understanding of the invention, however, its advantages and specific objects obtained with its use, reference should be had to the accompanying drawing, and descriptive matter in which I have illustrated and described a preferred embodiment of the invention.

In the drawing:

Fig. 1 is a view, partly in section, of an air control instrument embodying my invention, Fig. 2 is an enlarged view of one form of my invention, Fig. 3 is an enlarged view of another form of the invention, Fig. 4 is a section taken on line 4—4 of Fig. 3, Fig. 5 is a view of still another form of the invention, and Fig. 6 is a view taken on line 6—6 of Fig. 5.

Referring first to Fig. 1 there is shown therein by way of example a heater 1 whose temperature is to be controlled by means of a heating fluid supplied through a pipe 2. The supply of the fluid is adjusted by means of a valve 3 of the diaphragm type in which air under varying pressures is supplied to the diaphragm of the valve to proportionally control its opening. A bulb 4 that contains some temperature sensitive liquid that will expand upon heating thereof is inserted in the furnace and connected by capillary 5 to the stationary end of a Bourdon tube 6 which is in the form of a helix. As the temperature of the heater increases the tube will unwind and move a lever 7 fastened to its free end and pivoted around the shaft 8. Movement of this lever is used to control the pressure applied to the diaphragm of valve 3 in the following manner. The free end of lever 7 is connected by a link 9 to one arm of a bell-crank lever 10 pivoted at 11 the other arm of which is connected to a link 12 that supports one end of the lever 13 which is pivoted around a normally stationary support 14. Movement of the lever 13 pivots a flapper valve 15 relative to a bleed nozzle 16 to throttle the escape of air therethrough. The flapper 15 is pivoted at 17 and has a normal bias toward the nozzle which bias is overcome by pin 18 on one arm of a bell-crank lever 19 that is pivoted at 20 on a lever 21 which is in turn also pivoted at 17. As the lever 13 moves up and down around its right-hand end the bell-crank 19, attached to the center thereof, is moved around its supporting point 20 to shift the position of pin 18 and flapper 15. The nozzle 16 communicates with a chamber 22 formed between a cup shaped casing 23 and a bellows 24, both of which are attached at their open ends to a supporting plate 25. Also attached to the plate 25 is a second and smaller bellows 26 which forms, with the bellows 24, a second chamber 27 that is in restricted communication with the atmosphere through a tube 28 that terminates in a variable restricting member 29, to be described in detail below. The support 25 also has attached to it a member 30 that forms a support for the flapper 15 and the lever 21. A connecting link or rod 31 is attached at one end to the inner end of bellows 26, and at its other end to supporting lever 21.

Air is supplied to the chamber 22 and nozzle 16 at a suitably reduced pressure from a supply pipe 32 past a restriction 33 and through the pipe 34. This pipe 34 also communicates with a diaphragm 35 so that pressure changes in the chamber 22 will also be impressed upon the diaphragm. This diaphragm 35 is located within the casing 36 that is supplied with air directly from the pipe 32 through an inlet 37. Pivoted within the casing 36 is a valve member 38 that is normally biased toward the diaphragm 35 by spring 39 and which is moved between the inlet 37 and an exhaust opening 40. In this manner changes in pressure in the chamber 22 cause movement of the valve 37 between the supply and exhaust openings to thereby proportionately vary the pressure within the casing 36. The interior of the casing 36 is connected by a pipe 41 with the diaphragm chamber of the control valve 3. Therefore as pressure in chamber 36 varies the valve 3 will be opened or closed in accordance therewith.

On an increase in the pressure within the Bourdon tube 6 and a consequent movement of the part 10 in the clockwise direction, the valve 15 is moved a corresponding distance away from the nozzle 16, thereby reducing the pressure in 22. The pressure reduction in 22 elongates the bellows 24. The first effect of its elongation is to enlarge the inter-bellows space 27 and to reduce the pressure in the latter owing to the relatively slow inflow of air permitted by the restricted passage offered by part 29. The reduction in pressure in 27 elongates the bellows 26. The resultant movement of the bellows 26 moves the valve 15 back toward the nozzle 16, thereby tending to increase the pressure in chamber 22. In practice the mechanism is so proportioned and adjusted that the effect on the pressure in 22 of a change in position of the part 15 is only partially neutralized by the effect of the pressure change on the length of the bellows 24. The decrease in pressure in chamber 27 produces an inflow of air through the passage 28 which tends to slowly bring the pressure in chamber 27 into equality with the pressure of the atmosphere. As the pressure in the chamber 27 builds up, the bellows 26 shortens and thereby moves the valve 15 away from the nozzle 16 and back towards the position into which it was moved on the original change in position of the part 10 provided the latter remains stationary in the meantime. This latter movement is known as reset or droop correction and the speed with which it takes place is determined by the length of tubing in the member 29 through which the air must bleed as it goes to and from chamber 27. The converse of the actions just described occurs on a rise in the pressure in the Bourdon tube 6 and a corresponding adjustment of the part 10 in the counter-clockwise direction.

From what has just been said, it will be apparent that the first effect of a change in the controlling condition and corresponding change in the part 10 is to produce a corresponding initial change in pressure in the chamber 22. This initial change in pressure in the chamber 22 is automatically followed by a smaller reverse change in pressure, as the initial change effects a reversal of direction of the change in the controlling condition and the control apparatus may be adjusted so that the corresponding initial adjustment of the control valve 3 is quick enough and great enough to produce a substantial corrective effect without giving rise to such a hunting difficulty as would exist but for the automatic reverse change in pressure in the chamber 22.

It is to be assumed, for example, that an initial clockwise change of the position of the part 10 occurs as a result of an increase in temperature due to a decrease in furnace load which continues for some time so that less fuel is needed than was previously required, said change may well produce a temporarily excessive initial decrease in pressure in chamber 22, such that, if maintained, fuel would be supplied to the furnace more slowly than required to continuously meet the then existing demand on the furnace for heat. The extent of this decrease in pressure in 22 is gauged by the movement given the valve 15 by the expansion of the bellows 26, occurring as a result of such decrease. Such initial excess in fuel reduction tends quickly to arrest the rise of the furnace temperature, and to decrease the temperature. As the furnace temperature falls, the lever 10 turns counterclockwise and the tendency to an excessive decrease in that temperature is neutralized more or less by an accompanying increase in pressure in the chamber 22, resulting from the movement given the valve 15 by the counter-clockwise motion of lever 10, the magnitude of the increase being gauged by the compression of bellows 26 occurring as a result of such increase. The subsequent slow compression of the bellows 26, as the pressure in the chamber 27 approaches equality with that of the atmosphere, again tends to decrease the fuel supply to the furnace, but unless the furnace load has become still smaller in the meantime, the effect on position of the valve 15 of such compression of the bellows 26 will be partially neutralized by the decrease in the furnace temperature and resultant counter-clockwise change in position of the part 10. If the demand on the furnace for heat does not change after the bellows 26 has contracted to its normal or unflexed length, the valve 15 will come to rest with the part 10 in a position corresponding to a furnace temperature slightly higher than would exist in a stable operating condition with a larger demand on the furnace for heat.

As was stated above, the member 29, with which the applicant's invention is more particularly concerned, may take several forms, one of which is shown in Fig. 2. In this embodiment, the tube 28 which is in communication at one end with the chamber 27, is connected at its opposite end to the member 29 that comprises a cylindrical junction member 42 that is in turn adapted to be connected to four pieces of capillary tubing, each of which is preferably of a different length. These pieces of tubing are shown at 43, 44, 45 and 46 and they are provided with valves 47, 48, 49 and 50 between their ends and a passage 51 that is formed in a ring member 52. When a valve member is open the interior of that capillary tube is connected with the atmosphere through the passage 51 and an exhaust pipe 53.

In operation, the rate which the reset action of the instrument in Fig. 1 can take place, or the speed at which the bellows 26 will return to its normal length, depends upon the length of capillary tubing through which the air leading to this chamber has to travel. If, for example, all of the valves except 47 are closed then the rate of reset will be comparatively fast since the capillary tube 43 has only two convolutions formed therein. On the other hand, if all of the valves except 50 are shut then the rate of reset will be slower since the air will have to leak through the longer capillary tube 46. It will be obvious that by varying the lengths of these tubes and opening and closing different combinations of the valves that a great many different rates of reset can be obtained.

Another form of the invention is shown at 29A in Fig. 3 in which embodiment the tube 28 communicates with a passage 54 that is formed in a rotatable member 55. This member is supported by a cylindrical part 56 that has attached to it four pieces of capillary tubing 57, 58, 59 and 60, each of which is preferably of a different length. The member 56 is formed with passages that communicate with the inner ends of the capillary tubing and are so positioned that they can be made to line up with the passage 54. In the use of this embodiment of the invention the part 55 is rotated so that passage 54 will communicate with one of the pieces of capillary tubing. Since each of the pieces of tubing is of a different length from the other piece, four different speeds of reset can be obtained with this embodiment by merely rotating the part 55.

A third embodiment of the invention is shown at 29B in Fig. 5. This embodiment is somewhat similar to that shown in Fig. 3 in that the tube 28 is connected with a rotatable part 62 and somewhat similar to that of Fig. 2 in that various combinations of capillary tubes may be connected to tube 28. The part 62 provided with three passages, one of which is shown in Fig. 6 at 61 and is angular in shape and communicates at one end with the tube 28. A second, 63, which is also angular in shape, communicates at one end with the atmosphere and, the third 64 that is U shaped is adapted to communicate with the ends of two pieces of capillary tubing. Attached to the outer side of a cylindrical supporting member 65 are four pieces of capillary tubing 66, 67, 68 and 69 that are each of a different length and each may be connected to the chamber 27 and the atmosphere by rotating the part 62.

In the operation of this embodiment if the part 62 is rotated to the position shown in Fig. 5, air escaping from the chamber 27 must pass through tube 28, passage 61, the four convolutions of the capillary tube in 69, passage 64, two convolutions of part 66 and passage 63. This is a total of six convolutions to the capillary tube. If part 62 is rotated in a clockwise direction so that pipe 28 is connected with one end of the piece of tube 66 then the escaping air must pass through the two convolutions of 66 and the one convolution of part 67 or a total of three convolutions. By further rotating the member 62, the chamber 27 can be connected with capillary tube parts 67 and 68 and with parts 68 and 69 so that the air will be forced to pass through four and seven convolutions of the tubing respectively.

From the above detailed description it will be seen that I have provided a simple and inexpensive apparatus for varying the rate of reset of an air control instrument. In the arrangement shown, the lengths of the capillary tubing and the number of convolutions formed therein are by way of example only, since it will be obvious that the tubing can be made to take any shape and can be made of any length which is necessary for the operation of the instrument.

In order to change the control point of the instrument or the normal value of the temperature to be maintained in the heater, it is only necessary to raise and lower the supporting member 14 and thereby change the original position of the lever 13 for any given temperature. This may be easily accomplished by rotating a knob 70 that is connected to a bell crank member 71 which supports the upper end of the member 14. This bell crank is pivoted at 11 and is connected with the knob 70 by means of a link 72. It will be obvious that if knob 70 is rotated, the right hand end of lever 13 will be raised and lowered with respect to its left end and thereby the normal position of this lever will be varied for a given temperature of the bulb 4.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In an air control instrument having an expansible chamber, the combination of means to place the chamber in communication with the atmosphere including a junction member, tubular branches of various lengths connected therewith, a tubular ring member connected to each of said branches, a valve in each branch and a connection between the atmosphere and the interior of said ring.

2. In an air control instrument the combination of a restricted passage for the flow of air therein comprising a hollow cylinder, a plurality of pieces of tubing having varying flow resistance connecting at one end of each with the center of said cylinder, a valve in each piece of tubing, a tubular member connected to the other ends of each of said pieces of tubing and a connection between the interior of said tubular member and the atmosphere.

FREDERICK W. SIDE.